United States Patent
Biegelsen (10) Patent No.: US 6,487,002 B1
(45) Date of Patent: Nov. 26, 2002

(54) LARGE AREA MICRO-STRUCTURE TEMPLATE FOR CREATION OF CLOSELY PACKED ARRAYS

(75) Inventor: David K. Biegelsen, Portola Valley, CA (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/880,152

(22) Filed: Jun. 11, 2001

(51) Int. Cl.$^7$ .......................... G02B 26/00; G02B 5/126
(52) U.S. Cl. ........................ 359/296; 359/535
(58) Field of Search ................. 359/619, 452, 359/535, 536, 534, 540, 537, 538, 539, 546, 548, 296; 345/107, 108; 264/4.1, 8, 15

(56) References Cited

U.S. PATENT DOCUMENTS

| | | | |
|---|---|---|---|
| 4,143,103 A | 3/1979 | Sheridon | 264/4 |
| 5,754,332 A | 5/1998 | Crowley | 359/296 |
| 5,815,306 A | 9/1998 | Sheridon et al. | 359/296 |
| 6,055,091 A | 4/2000 | Sheridon et al. | 359/296 |
| 6,180,226 B1 * | 1/2001 | McArdle et al. | 428/332 |
| 6,327,091 B1 * | 12/2001 | Agano | 359/452 |
| 6,350,036 B1 * | 2/2002 | Hannington et al. | 359/534 |
| 6,365,262 B1 * | 4/2002 | Hedblom et al. | 428/143 |

FOREIGN PATENT DOCUMENTS

WO  WO 00/20922  4/2000

* cited by examiner

Primary Examiner—Georgia Epps
Assistant Examiner—Saeed Seyfari
(74) Attorney, Agent, or Firm—L. Robb (57) ABSTRACT

A micro-structure template for fabricating ordered arrays of particles includes a top surface and a bottom surface, with the top surface having a plurality of closely-spaced depressions. Particles are disposed in the closely-spaced depressions to form at least one layer of particles.

25 Claims, 9 Drawing Sheets

LARGE AREA MICRO-STRUCTURE TEMPLATE FOR CREATION OF CLOSELY PACKED ARRAYS

CROSS REFERENCE TO RELATED APPLICATIONS

The following copending application, U.S. application Ser. No. 09/880,284, filed Jun. 11, 2001, titled "Electrophoretic Display Device", is assigned to the same assignee of the present application. The entire disclosure of this copending application is totally incorporated herein by reference in its entirety.

INCORPORATION BY REFERENCE

The following U.S. patents are fully incorporated herein by reference: International Patent Application No. PCT/US99/23313 (Drzaic et al., "Encapsulated Electrophoretic Displays Having a Monolayer of Capsules"); U.S. Pat. No. 4,143,103 (Sheridon, "Method of Making a Twisting Ball Panel Display"); U.S. Pat. No. 5,754,332 (Crowley, "Monolayer Gyricon Display"); U.S. Pat. No. 5,815,306 (Sheridon et al., "Eggcrate Substrate for a Twisting Ball Display"); and U.S. Pat. No. 6,055,091 (Sheridon et al., "Twisting-Cylinder Display").

BACKGROUND OF THE INVENTION

This invention relates generally to visual displays and more particularly to an apparatus and method of making ordered arrays for reusable, addressable, paper-like visual displays, such as gyricon displays and the like.

Typically, a display device, in sheet form, comprises a thin sheet, which has many attributes of a paper document. It looks like paper, has ambient light valve behavior like paper (i.e. the brighter the ambient light, the more easily it may be seen), is flexible like paper, can be carried around like paper, can be written on like paper, can be copied like paper, and has nearly the archival memory of paper.

There have been different approaches to making a display sheet such as U.S. Pat. No. 4,143,103 titled "Method of Making a Twisting Ball Panel Display", in which a plurality of particles, which have an electrical anisotropy due to hemispherical surface coatings of different Zeta potential, are mixed with a light transparent liquid which is subsequently cured to form an elastomeric slab. Following curing of the liquid, the slab is immersed in a dielectric liquid, which is absorbed by the slab and which causes the slab to expand slightly. Expansion of the slab around the particles provides a plasticizer-filled cavity around each particle, allowing the particles to rotate to provide a display.

Alternatively, International Application No. PCT/US99/23313 titled "Encapsulated Electrophoretic Displays Having a Monolayer of Capsules" teaches an encapsulated electrophoretic display constructed with a monolayer of capsules on a substrate. The capsules, which may be non-spherical, contain electrophoretically mobile particles and a suspending fluid. The electrophoretic particles are constrained to move within the capsule under the influence of an external electric field.

A closely packed gyricon display is described in U.S. Pat. No. 5,754,332 titled "Monolayer Gyricon Display", which discloses a layer of close-packed spheres suspended in an elastomer. The close-packed layer according to this disclosure is accomplished by using an elastomer cured with a 15-percent curing agent (hardener) at 90 degrees Celsius. Upon application of the dielectric fluid, the elastomer expands only 20 percent as compared to 50 percent or more through the conventional curing process. By varying the composition of the dielectric fluids, expansion of the elastomer may be reduced to approximately 10 percent. Interstices between the spheres may be filled with smaller spheres.

An alternate approach was disclosed in U.S. Pat. No. 5,815,306 titled "Eggcrate Substrate for a Twisting Ball Display", in which the display includes a substrate having a cavity-containing matrix whose cavities are hollow cylindrical cells aligned with a lens array. Each cavity is filled with a transparent dielectric fluid and contains at most one optically anistropic particle, which is not attached to the substrate. The diameter and depth of the cavities are slightly larger than that of the particles. Each particle can have an anisotropy for providing an electrical dipole moment, with the electrical dipole moment rendering the particle electrically responsive. When the particle is rotatably disposed in an electric field while the electrical dipole moment of the particle is provided, the particle rotates to an orientation in which the electrical dipole moment aligns with the field.

Alternatively, U.S. Pat. No. 6,055,091 titled "Twisting-Cylinder Display", discloses a twisting-particle display based on nonspheroidal optically anisotropic particles disposed in a substrate. The particles can be bichromal cylinders, preferably aligned parallel to one another and packed close together in a monolayer. The substrate containing the cylinders can be fabricated with the swelled-elastomer techniques known from spherical-particle gyricon displays, with an agitation process step being used to align the cylinders within the sheet material.

A closely-packed monolayer display offers numerous advantages over a display containing randomly distributed spheres. Close-packed monolayer displays exhibit superior reflectance and brightness characteristics as compared with conventional gyricon displays, and the more of the monolayer plane that is covered by the gyricon elements, the better the reflectance and the brighter the display. However, the fabrication methods described in the art result in arrays having inter-sphere gaps, which negatively impact the reflectance and brightness characteristics of the display. A fabrication method is needed that would provide closely-packed ordered arrays with negligible inter-sphere gaps.

SUMMARY OF THE INVENTION

Briefly stated, and in accordance with one aspect of the present invention, there is provided a micro-structure template for fabricating ordered arrays of micro-particles. The template includes a top surface and a bottom surface, with a plurality of depressions disposed in the top surface. Particles are disposed in the depressions to form at least one layer of particles.

BRIEF DESCRIPTION OF THE DRAWINGS

The foregoing and other features of the instant invention will be apparent and easily understood from a further reading of the specification, claims and by reference to the accompanying drawings in which:

DETAILED DESCRIPTION OF THE INVENTION

Figure 1:
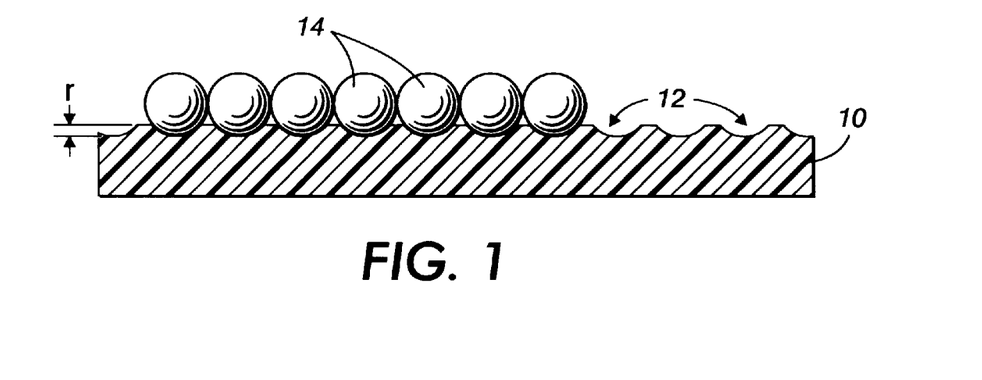
FIG. 1 illustrates a partial cross sectional view of an embodiment of the micro-structure template of this invention.

Referring to FIG. 1, there is shown a cross sectional view of one embodiment of the micro-structure template of this invention. The micro-structure template 10 consists of a surface with a plurality of depressions 12 spaced precisely to accommodate assembly of close-packed monolayers of a given diameter particle 14. Particles 14 may consist of any micro-structures, such as electrophoretic capsules as disclosed in International Application No. PCT/US99/23313 (Drzaic, "Encapsulated Electrophoretic Displays Having a Monolayer of Capsules"), gyricons for twisting ball displays, cylinders as disclosed in U.S. Pat. No. 6,055,091 (cited above), or particles of glass, polymer, metal, or gel. For convenience, the following discussion is directed toward the formation of gyricon displays. However, it will be understood that the micro-structure template disclosed herein may be utilized to construct any of numerous types of closely packed monolayers. The depressions 12 have a depth r, which is less than the diameter of particles 14. The depressions 12 are created to have a uniform distribution over the entire micro-structure template 10. Micro-structure template 10 is a single or multiple layer template of thin, flexible, or rigid material such as glass or any of a wide range of polymers. Depressions 12 in micro-structure template 10 may be created by photolithography, by energetic particle damage and subsequent etching, by laser ablation, by embossing, or by other known means.

It should be noted that in all the drawings of this specification for the purpose of clarity where there is a plurality of each element only a few are numbered. However, it should be understood that all the elements that have the same shape as the numbered elements are the same as the numbered elements.

Figure 2:
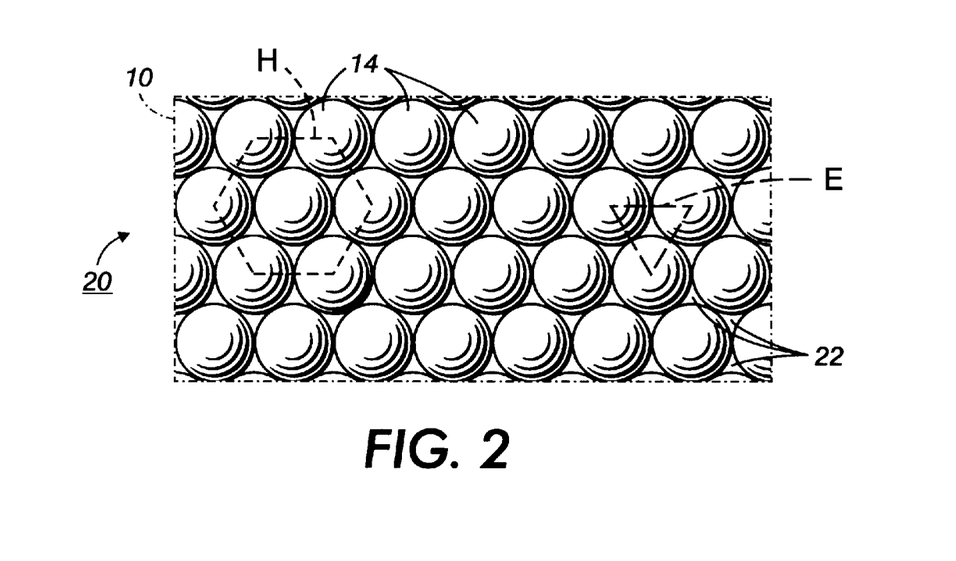
FIG. 2 illustrates a top view of a template of the present invention in an embodiment wherein the depressions are arrayed in a close-packed hexagonal formation.

To maximize the closeness of packing of the particles in the monolayer of micro-structure template 10, a hexagonal packing geometry may be utilized. FIG. 2 illustrates this geometry. A top view of a portion of the micro-structure template 10 is shown, with particles 14 filling the now concealed depressions. The centers of particles 14 form a hexagonal pattern as shown by exemplary hexagon H; that is, the centers of close neighboring particles form equilateral triangles, as shown by exemplary equilateral triangle E. Particles 14 have diameter d and center-to-center spacing D. Interstices 22 occur as a result of the geometry (a monolayer of monodisperse packed spheres cannot cover a plane entirely).

Figure 3:
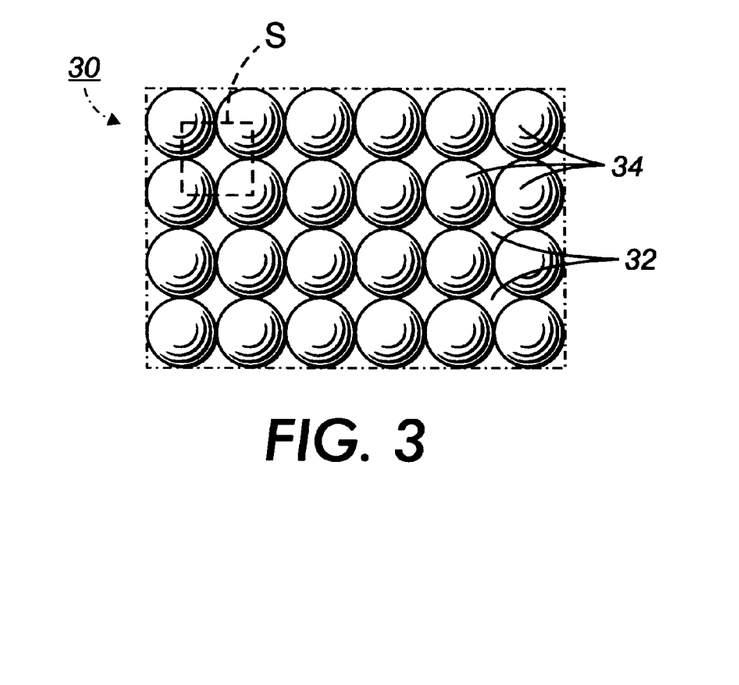
FIG. 3 illustrates a top view of a template of the present invention in a embodiment wherein the depressions are arrayed in a close-packed rectangular formation.
Figure 4:
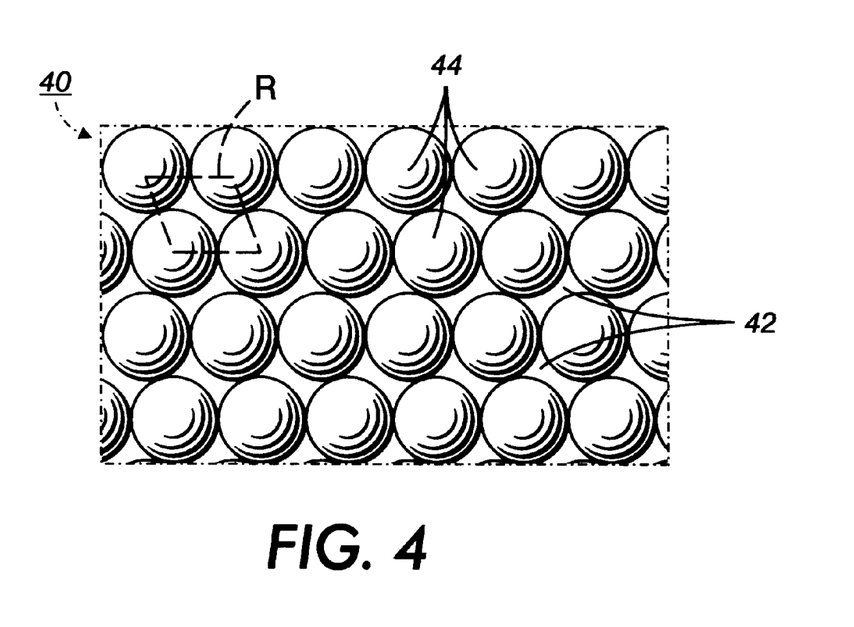
FIG. 4 illustrates a top view of a template of the present invention in a embodiment wherein the depressions are arrayed in a close-packed rhomboidal formation.

FIGS. 3-4 illustrate alternative packing geometries, which cover a smaller proportion of the plane than is covered by the hexagonal geometry. FIG. 3 shows a rectangular geometry. The rectangular geometry is shown by exemplary square S formed by the centers of particles 34. Particles 34 have diameter d and center-to-center spacing D. Interstices 32 are left unfilled by the packing geometry.

FIG. 4 shows a rhomboidal (diamond-shaped) geometry. The rhomboidal geometry is shown by exemplary rhombus R formed by the centers of particles 44. Particles 44 have diameter d and center-to-center spacing D. Interstices 42 are left unfilled by the packing geometry.

Figure 5:
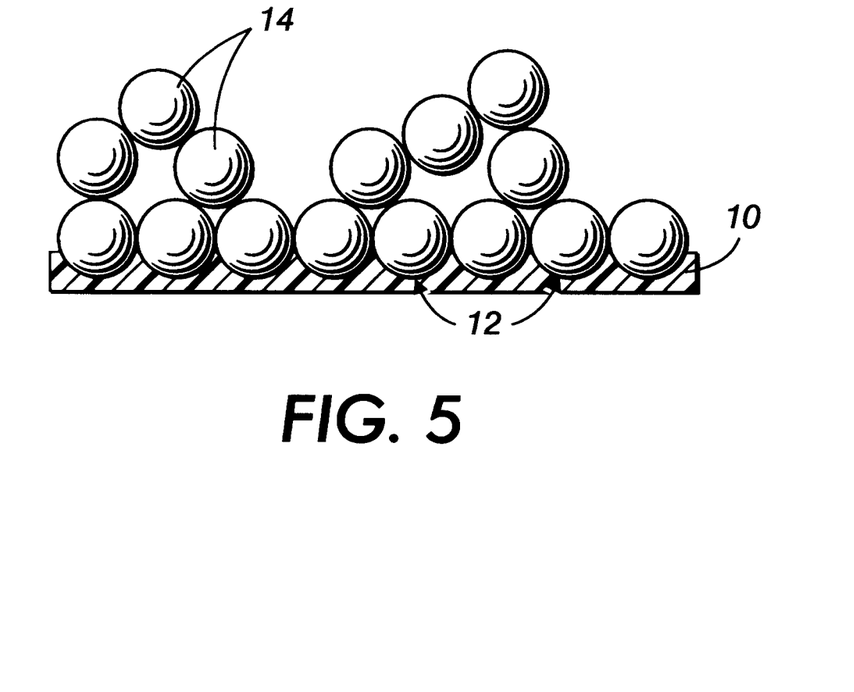
FIG. 5 illustrates a partial cross sectional view of the micro-structure template of this invention being filled with particles.

Referring now to FIG. 5, any of numerous methods may be used to place particles 14 within depressions 12. For example, a bed of particles may be gently passed over micro-structure template 10, such that particles 14 randomly fall into depressions 12. This process may be enhanced by gently vibrating micro-structure template 10. Alternatively, a blade may be passed over the template to encourage particles 14 to fill depressions 12. Excess particles 14 may be blown off with a burst of air or may be shaken or brushed away.

Figure 6:
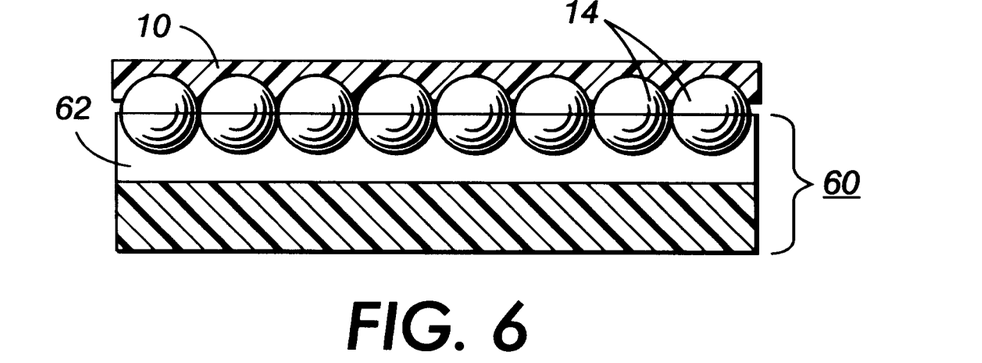
FIG. 6 illustrates a partial cross sectional view of the transfer of particles from the micro-structure template to a receiving substrate.

Once captured in template 10, particles 14 may be transferred to a receiving substrate 60, as shown in FIG. 6. The transfer may be achieved by pressing the layer of particles 14 against a substrate 60, which may be a metallized sheet, a polymer sheet, a partially-cured layer of elastomer, or any other material with a coating which is sufficiently tacky to cause particles 14 to adhere to its surface layer 62. Alternatively, particles 14 may be charged to a predetermined polarity and receiving substrate 60 may be charged to an opposite predetermined polarity, thus causing particles 14 to migrate to substrate 60. Charge neutralization is avoided by either the presence of a thin insulating film on the receiving substrate or the presence of a thin coating on the spheres.

Figure 7:
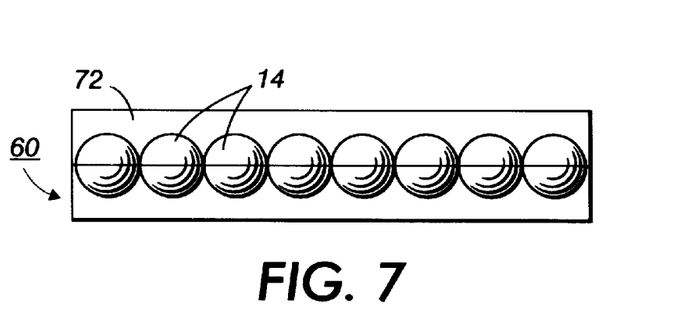
FIG. 7 illustrates a partial cross sectional view of particles captured in a substrate and top sheet.

Referring now to FIG. 7, substrate 60 and particles 14 may be overcoated with layer 72, which may be an elastomer or any other desired material. If particles 14 are gyricon balls, substrate 60, particles 14 and overcoating layer 72 may be cured, by methods known in the art, to form a gyricon sheet.

However, it will be appreciated that to form a gyricon sheet, it is not necessary to transfer particles 14 to a receiving substrate. The micro-structure template 10 with its captured particles 14 may be overcoated with layer 72, which may be an elastomer or any other desired material. If particles 14 are gyricon balls, micro-structure template 10, particles 14 and overcoating layer 72 may be cured, by methods known in the art, to form a gyricon sheet.

Figure 8:
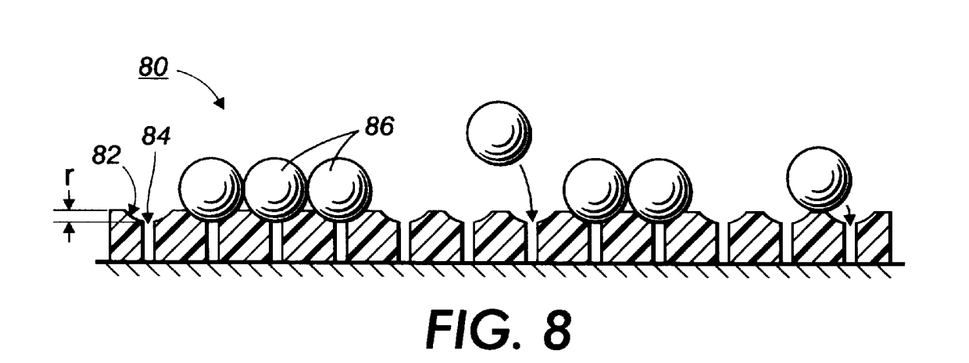
FIG. 8 illustrates a partial cross sectional view of another embodiment of the micro-structure template of this invention.

Referring to FIG. 8, there is shown a cross sectional view of another embodiment of the micro-structure template of this invention. In this embodiment, micro-structure template 80 consists of a surface with a plurality of depressions 82 spaced precisely to accommodate assembly of close-packed monolayers of a given diameter particle 86. Within each depression 82 is at least one cavity 84 extending from depression 82 through template 80. Template 80 can be beneficially formed as a single layer of suitable material or by the lamination of two or more sheets. Particles 86 may consist of any micro-structures, such as electrophoretic capsules as disclosed in International Application No. PCT/US99/23313 (cited above), spheres for twisting ball displays, cylinders as disclosed in U.S. Pat. No. 6,055,091 (cited above), or particles of glass, polymer, metal, or gel. For convenience, the following discussion is directed toward the formation of gyricon displays. However, it will be understood that the micro-structure template disclosed herein may be utilized to construct any of numerous types of closely packed monolayers. The depressions 82 have a depth r, which is less than the diameter of particles 86. The depressions 82 and their associated cavities 84 are created to have a uniform distribution over the entire micro-structure template 80. Micro-structure template 80 may be a thin, flexible material such as glass or any of a wide range of polymers, metals, ceramics, etc. Depressions 82 and cavities 84 in micro-structure template 80 may be created by photolithography, by energetic particle damage and subsequent etching, by laser ablation, by embossing, or by other known means.

To maximize the closeness of packing of the particles in the monolayer of micro-structure template 80, a hexagonal packing geometry may be utilized, as was described above and as illustrated in FIG. 2. Alternative packing geometries, which cover a smaller proportion of the plane than is covered by the hexagonal geometry, are also described above and illustrated in FIGS. 3 and 4.

Figure 9:
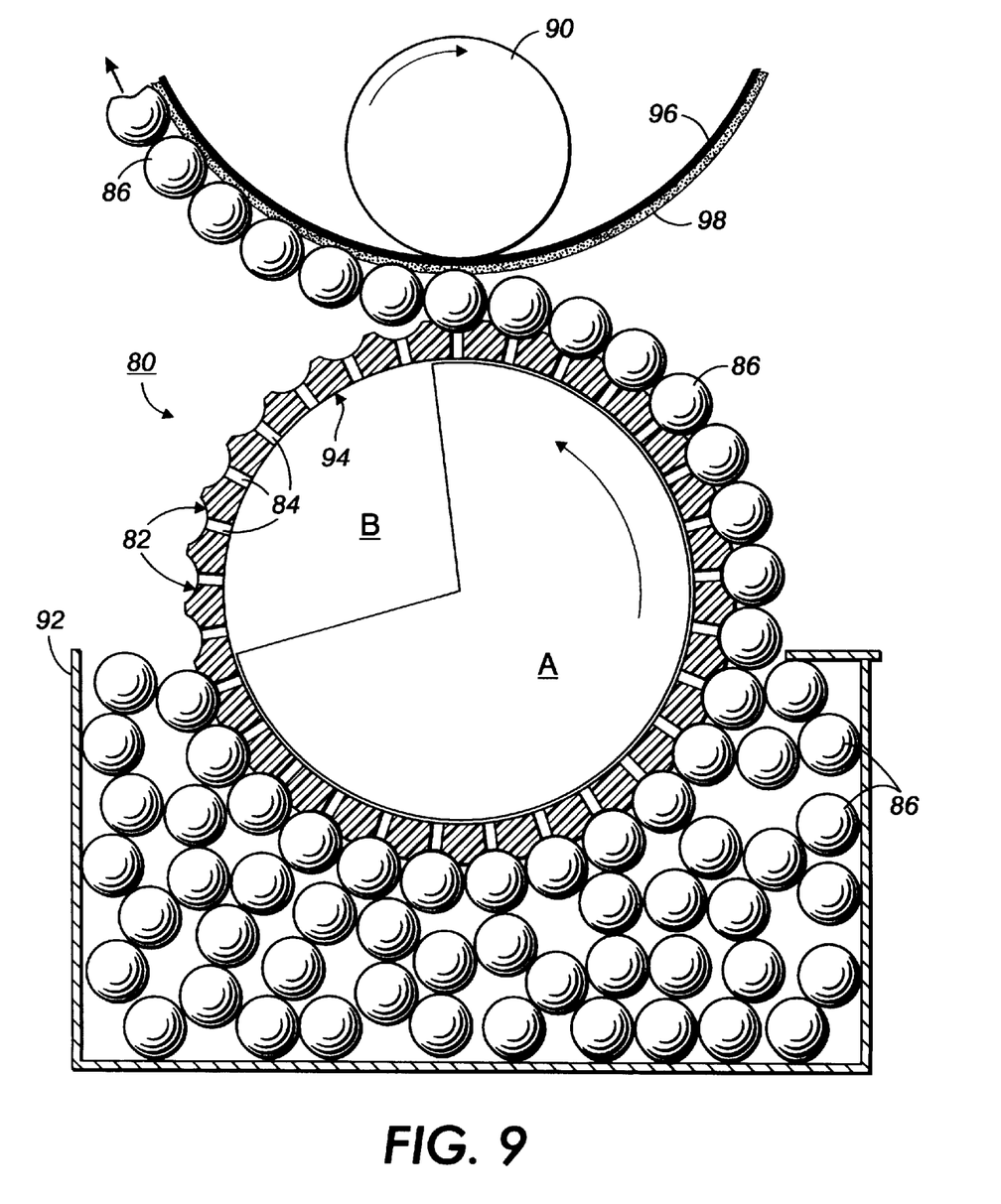
FIG. 9 illustrates a cross sectional view of a method for fabricating closely-packed arrays according to this invention.

Referring now to FIG. 9, particles 86 may be placed in depressions 82 of template 80 by several methods. According to a first method, as shown in FIG. 9, particles 86 are contained in receptacle 92, in which particles 86 are agitated by any known means. Template 80 is wrapped or formed on cylindrical form 94. The plurality of closely-packed cavities 84 in template 80 extend through the surface of cylindrical form 94. A vacuum (vacuum source not shown) is applied over region A of the interior of cylindrical form 94 with sufficient strength to attract and/or hold spheres 86 into depressions 82 in template 80. As cylindrical form 94 rotates around its longitudinal axis, spheres 86 approach substrate 96.

Substrate 96, which may be a metallized sheet, a polymer sheet, a partially-cured layer of elastomer, or any other material with a coating which is sufficiently tacky to cause particles 86 to adhere to its surface layer 98, is a compliant sheet that has the same properties and serves the same purpose as substrate 60 of FIG. 6. Substrate 96 may be coated with an adhesive on surface 98 or may be heated to soften surface 98 sufficiently for it to become tacky. As particles 86 contact surface 98, roller 90 presses surface 98 against particles 86. The vacuum is then released and over-pressure is applied in interior region B of cylindrical form 94, thus releasing particles 86 from template 80. As substrate 96 moves past cylindrical form 94, particles 86 are continuously deposited in a closely packed monodisperse layer on surface 98.

Alternatively, particles 86 may be placed in depressions 82 of template 80 when it is a flat plate by any of the methods described above in reference to FIG. 5. For example, a bed of particles may be gently passed over micro-structure template 80, such that particles 86 randomly fall into depressions 82. This process may be enhanced by gently vibrating micro-structure template 80. Alternatively, a blade may be passed over the template to encourage particles 86 to fill depressions 82. Excess particles 86 may be blown off with a burst of air or may be shaken or brushed away.

Figure 10:
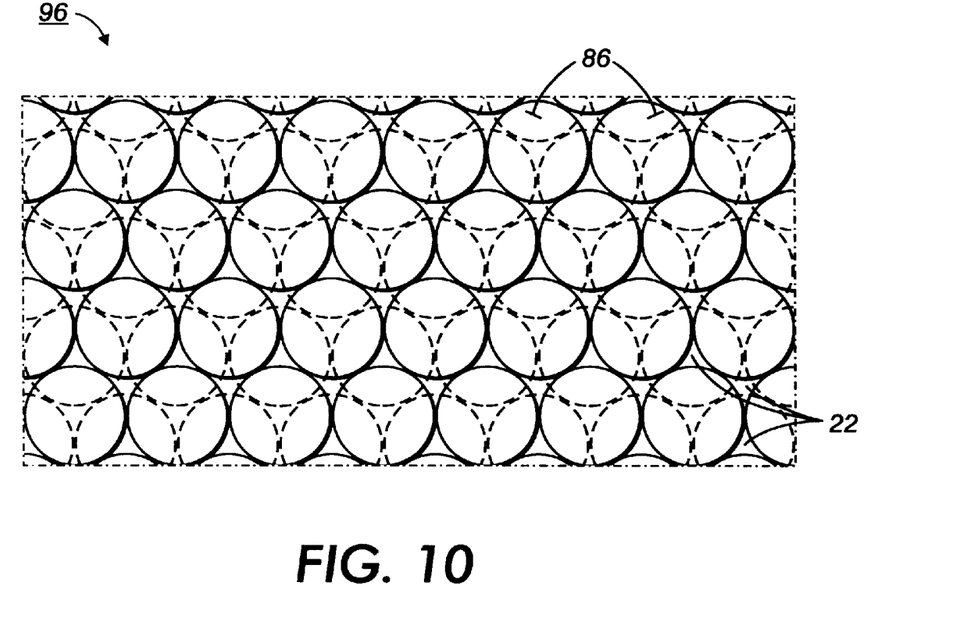
FIG. 10 illustrates a top view of the template of the present invention in an embodiment wherein two layers of particles are superimposed in close-packed hexagonal formation.

To fabricate a sheet having additional layers of particles 86, a monolayer of closely-packed particles is formed as described above. This monolayer is then coated with an optically transparent adhesive or a layer of sticky, partially cured elastomer. The second layer of particles is then dispersed over the monolayer. The second layer of particles adhere to the elastomer or adhesive in a stacking that may be either random or ordered. For example, FIG. 10 illustrates a stacking pattern in which the second layer of particles is placed in the interstices 22 of the monolayer deposited on substrate 96. Such ordering can be facilitated by using self-alignment of added spheres into interstices induced by the surface tension of an elastomer which is liquid during transfer of the spheres, and is then subsequently cured. In this ordered array, the hexagonal pattern of the monolayer is repeated in the second layer of particles 86. The resulting layers of particles 86 and substrate 96 may then be overcoated with a layer which may be an elastomer or any other desired material, as described above in reference to FIG. 7. If particles 86 are gyricon balls, substrate 96, particles 86 and the overcoating layer may be cured, by methods known in the art, to form a gyricon sheet.

Figure 11:
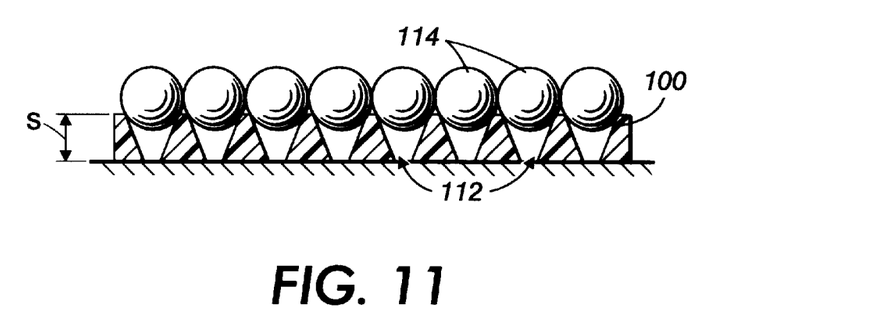
FIG. 11 illustrates a partial cross sectional view of another embodiment of the micro-structure template of this invention.

It should be noted that the depressions and cavities formed in the micro-structure template of this invention can have any shape. Although the embodiments disclosed above present a spherical shape for the depressions, they may also be conical, as illustrated in FIG. 11, which shows a cross sectional view of such a configuration. In this embodiment, the micro-structure template 100 consists of a surface with a plurality of conical depressions 112 spaced precisely to accommodate assembly of close-packed monolayers of a given diameter particle 114. Particles 114 may consist of any micro-structures, such as electrophoretic capsules as disclosed in International Application No. PCT/US99/23313 (Drzaic, "Encapsulated Electrophoretic Displays Having a Monolayer of Capsules"), gyricons for twisting ball displays, or particles of glass, polymer, metal, or gel. The depressions 112 have a depth s, which is less than the diameter of particles 114. The depressions 112 are created to have a uniform distribution over the entire micro-structure template 100. Micro-structure template 100 is a thin, flexible material such as glass or any of a wide range of polymers. Depressions 112 in micro-structure template 100 may be created by photolithography, by energetic particle damage and subsequent etching, by laser ablation, by embossing, or by other known means.

Figure 12:
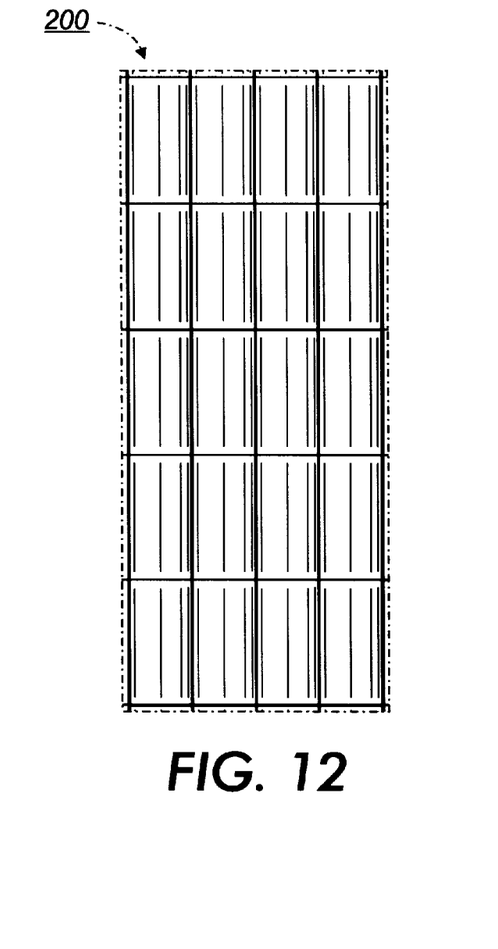
FIG. 12 illustrates a top view of the template of the present invention in an embodiment wherein the cylindrical depressions are arrayed in a close-packed rectangular formation.
Figure 13:
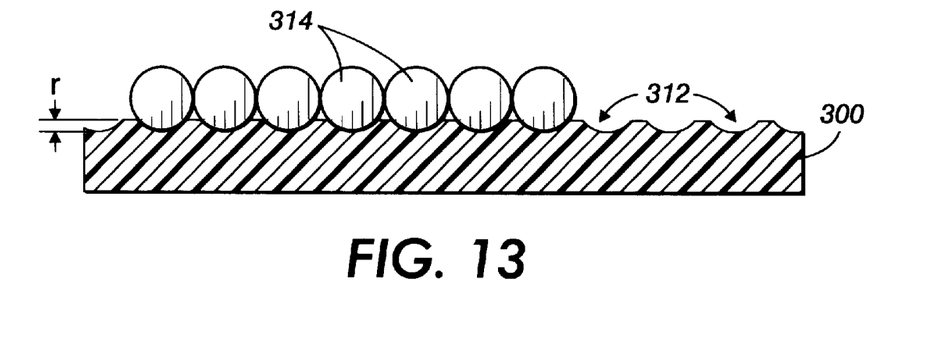
FIG. 13 illustrates a partial cross sectional view of the template of FIG. 12.
Figure 14:
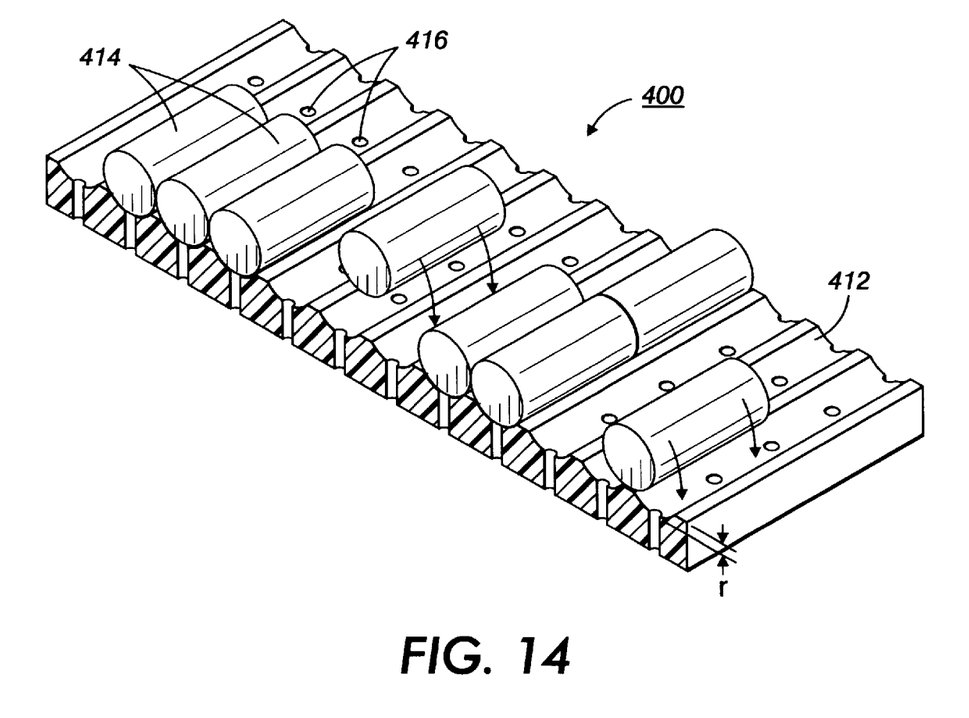
FIG. 14 illustrates a partial cross sectional view of another embodiment of the template of FIG. 12.

Alternatively, the depressions and cavities formed in the micro-structure template of this invention may be vertically or horizontally cylindrical, as illustrated in FIGS. 12 through 14, for the latter case. FIG. 12 shows a top view of a portion of micro-structure template 200 with cylindrical depressions in a rectangular packing geometry. However, it will be understood that alternate packing geometries could also be utilized. FIG. 13 shows a cross sectional view of the micro-structure template with cylindrical depressions. The micro-structure template 300 consists of a surface with a plurality of depressions 312 spaced precisely to accommodate assembly of close-packed monolayers of a given diameter cylinder 314. Cylinders 314 may consist of any micro-structures, such as electrophoretic capsules as disclosed in International Application No. PCT/US99/123313 (Drzaic, "Encapsulated Electrophoretic Displays Having a Monolayer of Capsules"), cylinders as disclosed in U.S. Pat. No. 6,055,091 (cited above), or cylinders of glass, polymer, metal, or gel.

For convenience, the following discussion is directed toward the formation of twisting cylinder displays. However, it will be understood that the micro-structure template disclosed herein may be utilized to construct any of numerous types of closely packed monolayers. The depressions 312 have a depth r, which is less than the diameter of cylinders 314. The depressions 312 are created to have a uniform distribution over the entire micro-structure template 300. Micro-structure template 300 is a thin, flexible or rigid material such as glass or any of a wide range of polymers. Depressions 312 in micro-structure template 300 may be created by photolithography, by energetic particle damage and subsequent etching, by laser ablation, by embossing, or by other known means.

Referring to FIG. 14, there is shown a cross sectional view of another embodiment of the micro-structure template with cylindrical depressions. In this embodiment, micro-structure template 400 consists of a surface with a plurality of depressions 412 spaced precisely to accommodate assembly of close-packed monolayers of a given diameter cylinder 414. Within each depression 412 is at least one cavity 416 extending from depression 412 through template 400. Cylinders 414 may consist of any micro-structures, such as those described above. The depressions 412 have a depth r, which is less than the diameter of cylinders 414. The depressions 412 and their associated cavities 416 are created to have a uniform distribution over the entire micro-structure template 400. Micro-structure template 400 may be a thin, flexible or rigid material such as glass or any of a wide range of polymers. Depressions 412 and cavities 416 in micro-structure template 400 may be created by photolithography, by energetic particle damage and subsequent etching, by laser ablation, by embossing, or by other known means. Any of the methods described herein may be employed to place cylinders 414 in depressions 412 of micro-structure template 400.

Figure 15A:
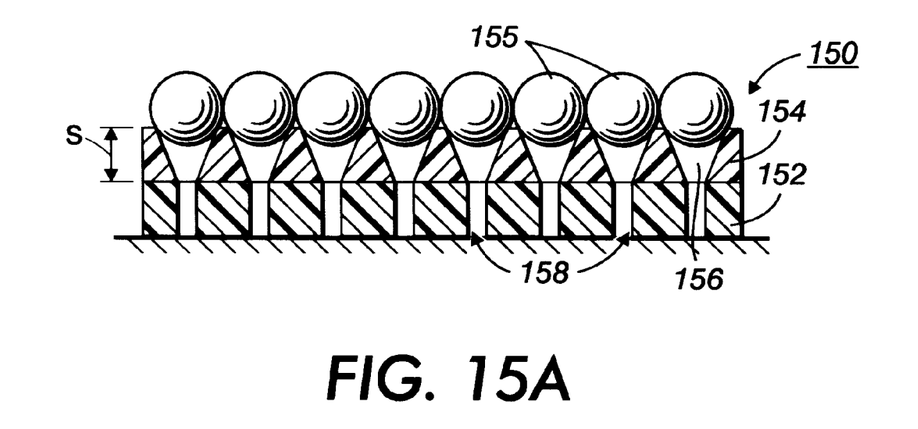
FIG. 15A illustrates a partial cross sectional view of another embodiment of the micro-structure template of this invention.
Figure 15B:
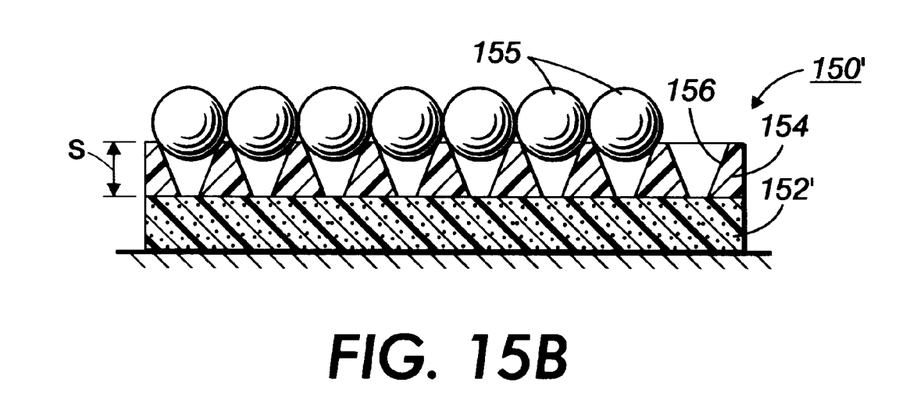
FIG. 15B illustrates a partial cross sectional view of another embodiment of the micro-structure template of this invention.

Referring to FIGS. 15A and 15B, there is shown a cross sectional view of another embodiment of the micro-structure template of this invention. In this embodiment, micro-structure template 150 is formed by the lamination of two or more layers of thin, flexible, or rigid material such as glass or any of a wide range of polymers. In FIG. 15A, layer 154 consists of a surface with a plurality of conical depressions 156 spaced precisely to accommodate assembly of close-packed monolayers of a given diameter particle 155. Particles 155 may consist of any micro-structure structures, such as electrophoretic capsules as disclosed in International Application No. PCT/US99/23313 (Drzaic, "Encapsulated Electrophoretic Displays Having a Monolayer of Capsules"), gyricons for twisting ball displays, or particles of glass, polymer, metal, or gel. The depressions 156 have a depth s, which is less than the diameter of particles 155. The depressions 156 are created to have a uniform distribution over the entire micro-structure template 150. Depressions 156 in micro-structure template 150 may be created by photolithography, by energetic particle damage and subsequent etching, by laser ablation, by embossing, or by other known means. Layer 152 consists of a plurality of cavities 158 spaced to align with depressions 156 of layer 152. Although this embodiment presents a conical shape for the depressions, they may be spherical, cylindrical, or any other shape capable of accommodating the assembly of close-packed monolayers of particles.

Alternatively, the embodiment of FIG. 15B shows a cross sectional view of micro-structure template 150'. Micro-structure template 150' includes layer 152', which may consist of a porous material laminated to layer 154. In FIG. 15B layer 154, depressions 156, particles 155, and depression depth s have the same properties and serve the same purpose as the embodiment described in FIG. 15A. It should be noted that the depressions formed in layer 154 of this embodiment of the micro-structure template can have any shape. Although this embodiment presents a conical shape for the depressions, they may be spherical, cylindrical, or any other shape capable of accommodating the assembly of close-packed monolayers of particles.

The advantage of the micro-structure template according to this invention includes the capability of a more cost-effective method for the production of ordered arrays of micro elements, such as those utilized in electric paper displays. Closely-packed ordered arrays for electric paper provide enhanced reflectance and brightness characteristics, with this effect optimized as more of the monolayer plane of the array is covered. Furthermore, no line defects, such as grain boundaries, occur as frequently arise for self-assembled particle packings.

It should be understood that numerous changes in details of construction and the combination and arrangement of elements and materials may be resorted to without departing from the true spirit and scope of the invention as hereinafter claimed.

What is claimed is:

1. A micro-structure template for fabricating ordered arrays comprising:
 a template substrate having a top surface and a bottom surface, said top surface having a pattern, said pattern comprising a plurality of closely-spaced depressions;
 means for disposing a plurality of particles in said plurality of closely-spaced depressions to form at least one layer of said plurality of particles in said plurality of closely-spaced depressions; and
 a plurality of neck portions separating each of said particles disposed in said closely spaced depressions from said bottom surface of the template.

2. The micro-structure template according to claim 1, wherein said particles are substantially spherical in shape.

3. The micro-structure template according to claim 1, wherein each of said plurality of depressions has a shape, said shape being substantially concave.

4. The micro-structure template according to claim 1, wherein each of said plurality of depressions has a shape, said shape being substantially conical.

5. The micro-structure template according to claim 1, wherein said particles are substantially cylindrical in shape.

6. The micro-structure template according to claim 1, wherein each of said plurality of depressions has a shape, said shape being substantially cylindrical, said cylindrical shape having an axis, wherein said axis is disposed substantially perpendicular to said top surface of the micro-structure template.

7. The micro-structure template according to claim 1, wherein each of said plurality of depressions has a shape, said shape being substantially cylindrical, said cylindrical shape having an axis, wherein said axis is disposed substantially parallel to said top surface of the micro-structure template.

8. The micro-structure template according to claim 1, wherein the particles are arrayed in a hexagonally packed array.

9. The micro-structure template according to claim 1, wherein the particles are arrayed in a quadrilaterally packed array.

10. The micro-structure template according to claim 1, wherein the particles are arrayed in a rhomboidally packed array.

11. The micro-structure template according to claim 1, further comprising a vacuum source disposed along said bottom surface of said micro-structure template such that said particles are attracted into said depressions in said top surface upon activation of said vacuum source.

12. The micro-structure template according to claim 1, wherein at least one of said plurality of neck portions separates each of said particles disposed in said closely spaced depressions from the bottom surface of the template.

13. The micro-structure template according to claim 1, wherein no more than one of said plurality of neck portions separates each of said particles disposed in said closely space depressions from the bottom surface of the template.

14. The micro-structure template according to claim 1, wherein said particles comprise a plurality of encapsulated electrophoretic elements.

15. The micro-structure template according to claim 1, wherein said particles comprise a plurality of optically anisotropic particles.

16. The micro-structure template according to claim 1, further comprising a receiving substrate for receiving said monolayer of particles from said template substrate.

17. The micro-structure template according to claim 1, wherein the template substrate comprises a plurality of layers.

18. The micro-structure template according to claim 1, wherein the plurality of particles is disposed in said plurality of depressions of the micro-structure template to form a plurality of layers of particles.

19. The micro-structure template according to claim 18, wherein no more than two layers of particles are disposed on said micro-structure template.

20. The micro-structure template according to claim 18, wherein no more than three layers of particles are disposed on said micro-structure template.

21. The micro-structure template according to claim 18, wherein each layer of particles of said plurality of layers of particles is aligned with the layer of particles adjacent to it.

22. The micro-structure template according to claim 18, further comprising alternating layers of particles, wherein a first set of alternating layers of particles is disposed such that the particles within each layer of said first set of alternating layers of particles are aligned, one alternating layer with the other alternating layer, and a layer of particles of a second set of alternating layers of particles is disposed between each layer of particles of said first set of alternating layers of particles such that the particles within each layer of said second set of alternating layers of particles are disposed in the spaces between the particles of each layer of said first set of alternating layers of particles.

23. The micro-structure template according to claim 11, further comprising:
   a supply of particles positionable in proximity to the micro-structure template;
   a pressure source of air capable of generating at least a low pressure;
   a substrate for receiving said supply of particles, said substrate having a receiving surface and a non-receiving surface; and
   a roller disposed adjacent to said non-receiving surface of said substrate.

24. The micro-structure template according to claim 23, wherein said roller disposed adjacent to said non-receiving surface of said substrate presses said receiving surface of said substrate toward the particles disposed in said micro-structure template.

25. The micro-structure template according to claim 23, wherein said pressure source provides sufficient pressure to repel said particles disposed in said micro-structure template.

* * * * *